United States Patent [19]

Hughes

[11] 4,398,281
[45] Aug. 9, 1983

[54] CADDY LOADING VIDEO DISC PLAYER
[75] Inventor: Larry M. Hughes, Indianapolis, Ind.
[73] Assignee: RCA Corporation, New York, N.Y.
[21] Appl. No.: 311,839
[22] Filed: Oct. 16, 1981
[51] Int. Cl.³ .............................................. G11B 3/58
[52] U.S. Cl. .................................... 369/77; 271/164; 352/72; 360/133
[58] Field of Search .......................... 369/77, 79, 75; 271/164; 360/133; 352/72

[56] References Cited
U.S. PATENT DOCUMENTS 4,146,912 3/1979 Kukreja ................................ 360/99
4,285,524 8/1981 Hughes et al. ....................... 369/71
4,301,486 11/1981 Brown et al. ........................ 360/133

Primary Examiner—Steven L. Stephan
Attorney, Agent, or Firm—E. M. Whitacre; J. S. Tripoli; D. A. Kulkarni

[57] ABSTRACT

In a video disc player, an empty sleeve is inserted into an input slot provided in the player along a pair of guide rails to retrieve a record/spine assembly retained therein. The caddy guide rails are provided with a set of oppositely disposed notches near the input slot to block the entry of the sleeve into the player if its entrance angle is too sharp, thereby reducing the possibility of retrieval of the spine without the record.

5 Claims, 6 Drawing Figures

CADDY LOADING VIDEO DISC PLAYER

This invention generally relates to a video disc player, and more particularly, it concerns a caddy-type video disc player.

In certain systems, picture and sound signals are stored on a disc record in the form of physical undulations in a continuous spiral track disposed on the record surface. The variations in electrical capacitance between an electrode disposed on a record-engaging stylus and a conductive property of the record are sensed as the physical undulations on the record surface pass beneath the stylus tip. The capacitive variations are converted into electrical signals suitable for application to a conventional television receiver. A capacitance-type pickup system is illustratively disclosed in U.S. Pat. No. 3,842,194 (Clemens).

Typically, a video disc record is housed in a planar protective caddy which comprises an outer jacket and a record retaining spine. The spine is provided with an opening in which a record is received to form a record/spine assembly. For record loading, a fully caddy is manually inserted into an input slot provided in the player along a pair of guide rails. A record extraction mechanism disposed in the player removes the record/spine assembly from the jacket for retention in the player on a set of receiving pads during subsequent jacket withdrawal. To transfer the record to the turntable for playback, the turntable is raised relative to the receiving pads. The player is provided with hold-down members which hold the spine in place while allowing the record to be picked up by the turntable when it is raised. During playback, the pickup stylus is traversed radially across the record while the turntable rotates the record at the desired speed (e.g., 450 rpm). For record retrieval, the record is transferred back to the receiving pads by lowering the turntable with respect to the receiving pads to redefine the record/spine assembly. An empty jacket is then reinserted into the player, whereby the record/spine assembly is retrieved into the jacket.

In such a system, a problem might arise during the retrieval of a retained record/spine assembly if the empty jacket is inserted into the player at a steep angle to the caddy guide rails. It is possible to force the jacket under or over the record and only pickup the spine without the record if the angle of entry of the jacket is too severe. The subject invention calls for a pair of notches disposed in the guide rails near the caddy input slot to block the caddy entry if its entrance angle is too severe, thereby reducing the possibility of a malfunction of the caddy extraction mechanism.

Figure 1:
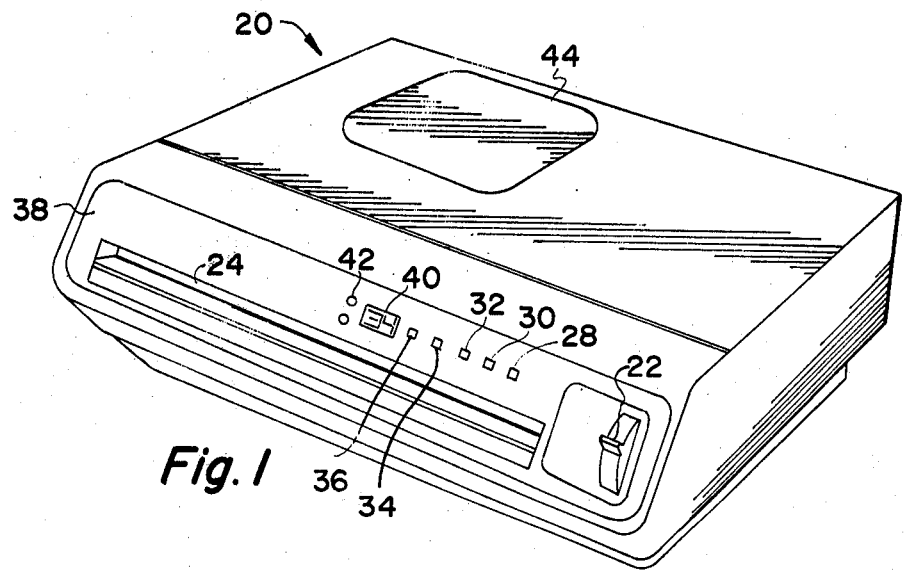
FIG. 1 is a video disc player incorporating the caddy guide rails in accordance with the instant invention.

Shown in FIG. 1 is a video disc player 20 incorporating the caddy guide rails in accordance with the present invention. A function lever 22 on the front side of the player is subject to disposition in any one of three positions - OFF, PLAY and LOAD/UNLOAD. A caddy entry door closes a caddy input slot 24 when the function lever 22 is disposed in the OFF and PLAY positions. In the LOAD/UNLOAD position of the function lever 22, the caddy entry door is opened to permit insertion of a full video disc caddy 26, shown in FIG. 2, into the player to load an enclosed record therein. A pushbutton 28 is provided to dispose the player in the "PAUSE" mode to allow the viewer to interrupt the program for as long as desired without missing any of the program content. In the PAUSE mode, the pickup device is raised and its lateral motion is arrested. A set of pushbuttons 30, 32, 34 and 36 are arranged on the instrument panel 38 to dispose the player in any one of four "SEARCH" modes, i.e., rapid access (forward/reverse) and visual search (forward/reverse), to permit the viewer to quickly locate a precise section of the prerecorded program. During rapid access, the pickup device is lifted, and rapidly moved sideways. In visual search, the pickup device is rapidly moved sideways while in engagement with the record. A digital LED readout 40 provides an indication of playing time and other functions, such as PAUSE, LOAD/UNLOAD and END-OF-PLAY, etc. A pair of tally lights 42 are operated to provide an indication of the record side subject to play, e.g., "SIDE 1" and "SIDE 2". A removable door 44 is disposed on the cover of the player to provide access to a stylus cartridge 46, shown in FIG. 3, so that it can be changed when required.

Figure 2:
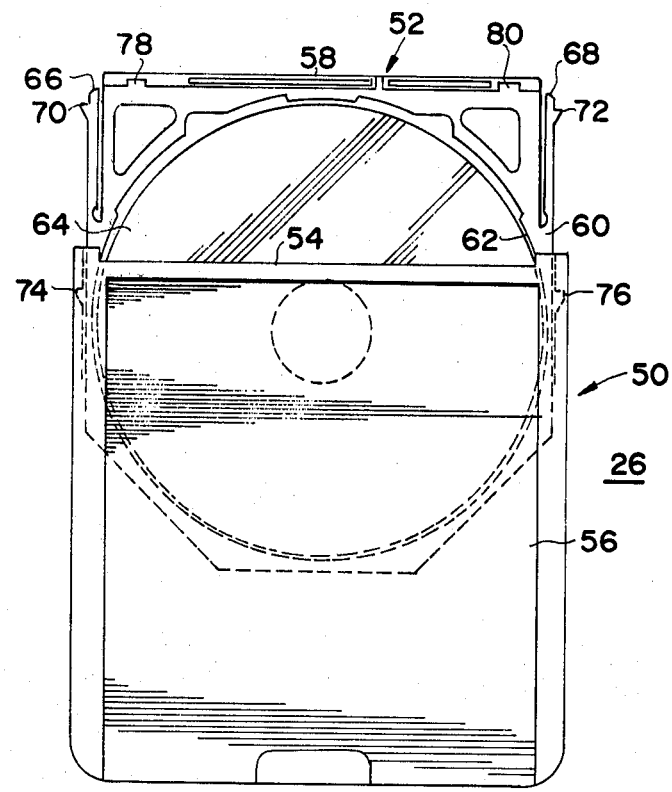
FIG. 2 shows a video disc caddy suitable for use with the player of FIG. 1 in the practice of the subject invention.
Figure 5:
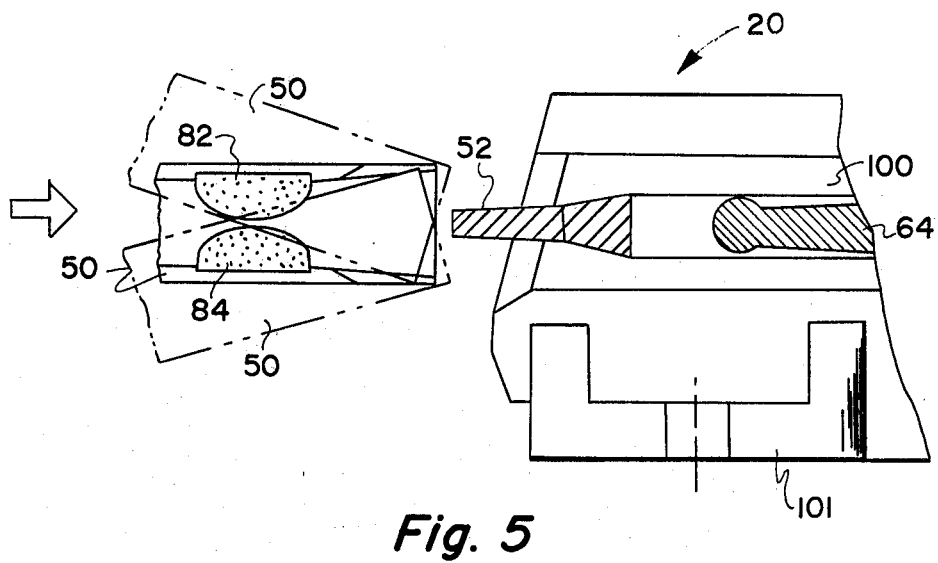
FIG. 5 illustrates this problem with the caddy guide rails without the subject modification.

As shown in FIG. 2, the video disc caddy 26 comprises a jacket 50 and a record retaining spine 52. The jacket 50 has an edge opening 54 in communication with a cavity 56 for enclosing a record/spine assembly. The spine 52 has a portion 58 which serves as a closure, and a further portion 60 having a circular opening 62 for receiving a centrally-apertured record 64. The spine 52 is further fitted with integrally-molded, flexural latch fingers 66 and 68. Each of the spine latch fingers 66 and 68 has a protruding element 70 and 72. The protruding elements 70 and 72 are received in pockets 74 and 76 disposed in the jacket 50 for capturing the spine 52 when it is fully seated therein. The spine 52 is provided with cutouts 78 and 80 for selectively receiving a pair of spine gripper members mounted in the player to secure the spine thereto in the manner explained later. The interior surfaces of the jacket 50 are fitted with lip pads 82 and 84, shown in FIG. 5, along the edge opening 54 to form a lip seal for keeping the dust from entering into the record enclosing cavity 56.

Figure 3:
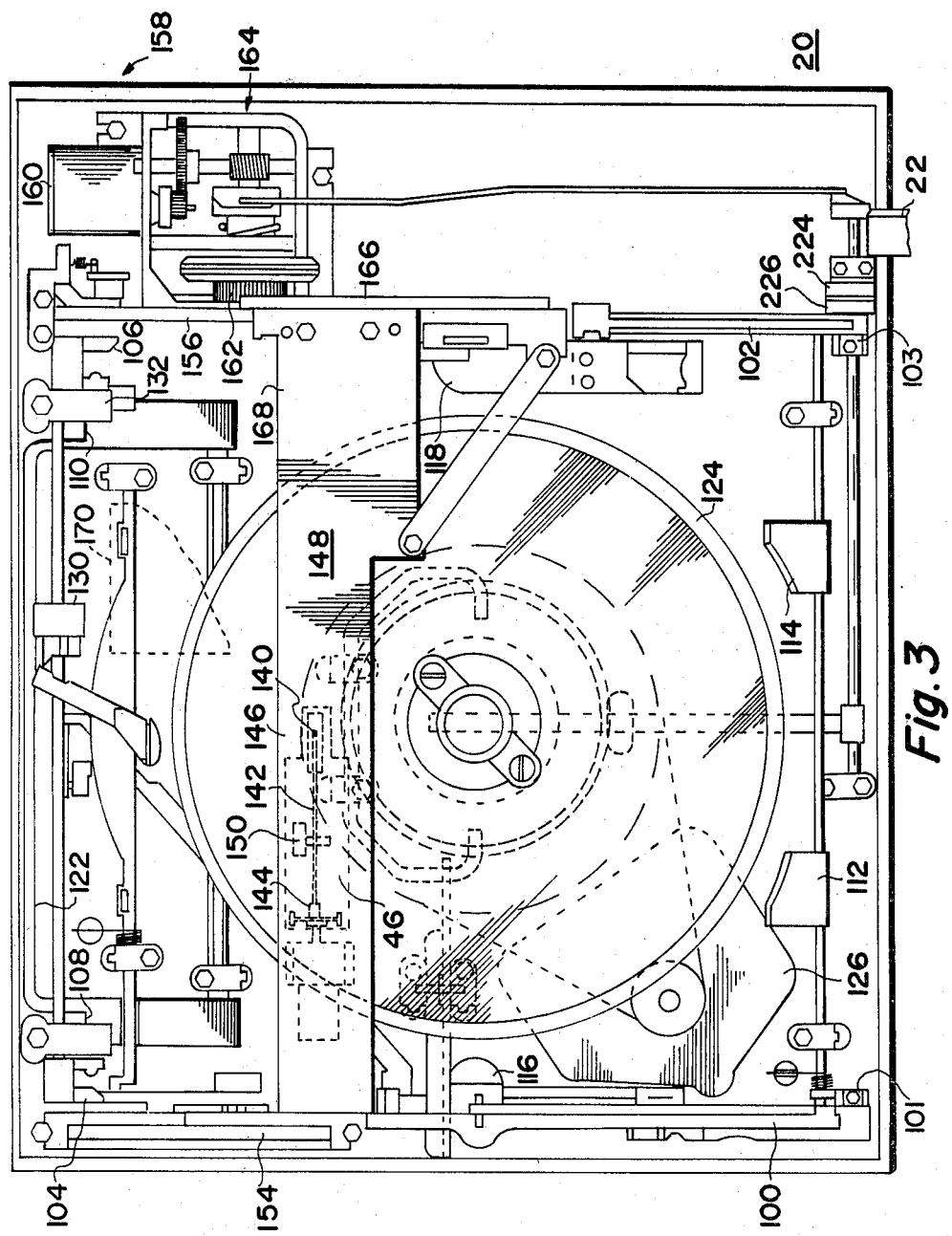
FIG. 3 represents a plan view of the player of FIG. 1 with its cover removed to show the underlying details including the subject caddy guide rails.

The operation of a record loading/unloading mechanism provided in the player will first be explained in conjunction with FIG. 3. The side rails 100 and 102 are respectively fitted with brackets 101 and 103 for securing the side rails to the housing of the player. To insert a record, a loaded caddy 26 is guided into the input slot 24 along a path defined by side rails 100 and 102. As the caddy arrives at a fully inserted position in the player, latch defeat members 104 and 106 enter the jacket 50 to defeat the spine latch fingers 66 and 68, thereby freeing the spine 52 from the jacket. Pivotally mounted in the player are spine gripper members 108 and 110 which are received in the respective cutouts 78 and 80, arranged in the spine 52, when the caddy arrives at the fully inserted position in the player in order to lock the spine to the player. Since the spine 52 is released from the jacket 50 through the operation of the latch defeat members 104 and 106 and is latched to the player through the operation of the spine gripper members 108 and 110, subsequent withdrawal of the jacket leaves the record/spine assembly in the player. The retained record/spine assembly is supported on a set of depressible receiving pads 112, 114, 116, 118 and 120. A pair of springs (not shown) disposed between a gripper arm 122, which carries the spine gripper members 108 and 110, and the latch defeat members 104 and 106 effect downward deflection of the latch defeat members upon jacket withdrawal.

To transfer the retained record to a turntable 124, the function lever 22 is displaced to the PLAY position, which, in turn, raises the turntable and starts a turntable motor 126. A set of hold-down members 128, 130 and 132 hold the retained spine 52 in place against the receiving pads 112, 114, 116, 118 and 120 while permitting the retained record to be intercepted by the turntable 124 when it is raised. The hold-down members 128, 130 and 132 also serve to accurately locate the retained spine 52, longitudinally and laterally, in the player.

A pickup stylus 140 is disposed at one end of a stylus arm 142, the other end of which is suspended in the cartridge 46 by means of a flexible rubber coupler 144. The cartridge 46 is placed in a compartment 146 provided in a stylus arm carriage 148, and the carriage lid, not shown, is closed.

A stylus arm lifter 150 is mounted in the carriage 148 to selectively lower the pickup stylus 140 through an opening 152 provided in the bottom wall of the carriage to effect record engagement. During playback, the carriage 148 is translated on guide ways 154 and 156 disposed parallel to the caddy side rails 100 and 102 from a starting position at the back of the player toward the front of the player in synchronism with the radially inward motion of the pickup stylus 140. The carriage drive mechanism 158 comprises a servo-controlled motor 160 which drives a pinion 162 through a gear train 164. The pinion 162 engages a rack 166 secured to the underside of the carriage 148 to translate the carriage along the guide ways 154 and 156 in such a way as to keep the pickup stylus 140 centered in the cartridge 46. During playback, the variations in electrical capacitance between an electrode carried by the stylus 140 and a conductive property of the record 64, in correspondence to the rises and falls of the disc surface under the stylus end, are sensed by pickup circuitry 168 to reproduce the stored information on the record. The recovered signals are processed by signal processing circuits 170 to reconstruct a television signal containing picture and sound information for application to a television receiver.

To transfer the record back to the receiving pads 112, 114, 116, 118 and 120 after playback, the function lever 22 is depressed to the LOAD/UNLOAD position, which, in turn, lowers the turntable 124 to a level below the receiving pads. When the turntable 124 is lowered, the record is deposited on the receiving pads 112, 114, 116, 118 and 120 for reception in the opening 62 disposed in the spine 52 to redefine the record/spine assembly. The turntable motor 126 is shut off when the function lever 22 is displaced to the LOAD/UNLOAD position. The location of the receiving pads 112, 114, 116, 118 and 120, occupying the raised position thereof, is such that the record/spine assembly is aligned with the center line of the caddy side rails 100 and 102.

Figure 4:
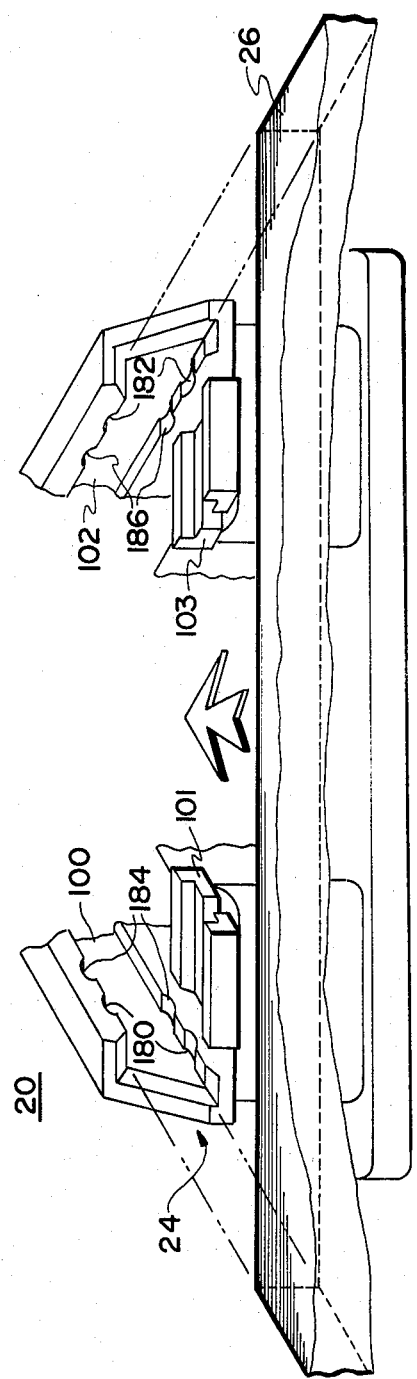
FIG. 4 is a diagrammatic representation of the caddy guide rails modified in accordance with this invention.

To retrieve the record/spine assembly, the empty jacket 50 is inserted straight into the player through the input slot 24 substantially along the caddy side rails 100 and 102 in the manner shown in FIG. 4. As the jacket 50 is driven into the player, the front edge thereof engages the carriage 148 to push it back to a preset travel limit stops defining the starting position, and it also engages the already deflected latch defeat members 104 and 106 to cause further downward deflection thereof. Such further downward deflection of the latch defeat members 104 and 106, in turn, effects downward displacement of the spine gripper members 108 and 110, whereby the spine 52 is freed from the player. When the jacket 50 is fully inserted into the player, the protruding elements 70 and 72 of the spine latch fingers 66 and 68 snap back into the pockets 74 and 76 to lock the spine 52 to the jacket. The record/spine assembly is withdrawn from the player when the caddy is extracted.

Figure 6:
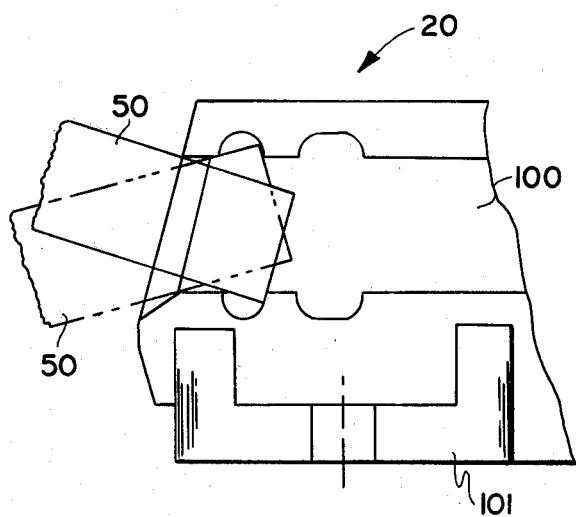
FIG. 6 depicts the operation of the subject caddy guide rails.
Figure 5:
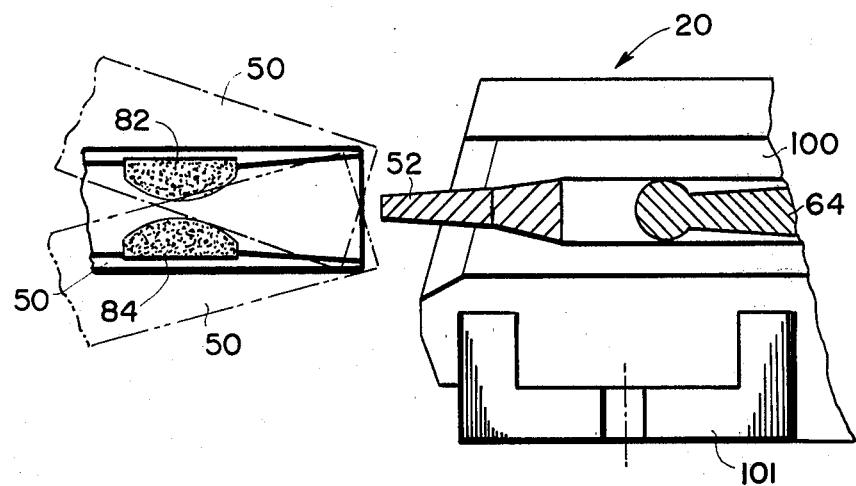
Figure 6:
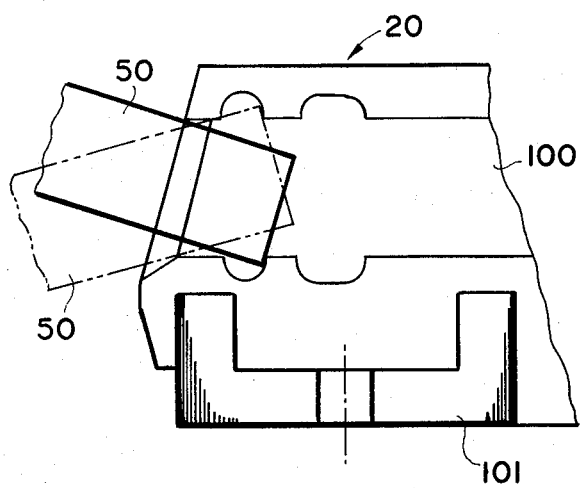

As previously indicated, a malfunction might occur during the retrieval of a retained record/spine assembly if the empty jacket 50 is not aligned with the caddy guide rails 100 and 102 during its insertion into the player. If the empty jacket 50 is inserted at an angle, in the manner indicated in FIG. 5, it is possible to force the jacket under or over the record 64 and retrieve only the spine 52 without the record. An angular entry of the jacket 50 into the player might also cause the spine 52 to catch on the edge of one of the lip pads 82 and 84, thereby damaging the lip seal. A five degree angle between the jacket 50 and the guide rails 100 and 102, for example, might be sufficient to cause a malfunction. The caddy guide rails 100 and 102 modified pursuant to this invention overcome this problem. Two sets of oppositely disposed notches 180, 182, 184 and 186 are provided in the caddy guide rails 100 and 102 adjacent to the input slot 24 as illustrated in FIGS. 4 and 6. The subject notches block the entry of the jacket 50 if the entrance angle is too severe in the manner shown in FIG. 6, thereby reducing the possibility of a malfunction of the record extraction mechanism.

The second set of notches 184 and 186 is provided as a backup to the first set of notches 180 and 182. If the user misses the first set of notches 180 and 182, or if he partially inserts a jacket straight into the player and then changes the direction of jacket insertion, the second set of notches 184 and 186 stop further jacket insertion if the entrance angle of the jacket is too severe.

Illustratively, the relevant dimensions are as follows.
1. Caddy width: 12.80 inches.
2. Caddy length: 14.00 inches.
3. Caddy thickness: 0.250 inches.
4. Caddy guide rail channel height: 0.285 inches.
5. Width of the first set of notches = 0.100 inches.
6. Width of the second set of notches = 0.150 inches.
7. Height of the notches = 0.060 inches.
8. The distance between the front edge of the guide rails and the front edge of the first set of notches = 0.187 inches.
9. The spacing between the two sets of notches = 0.100 inches.

What is claimed is:
1. In a record player for recovering prerecorded information from a disc record; said record being enclosed in a planar protective caddy; said caddy being inserted into an input slot provided in said player substantially along a path formed by a pair of guide rails to load an enclosed record into said player; an improvement comprising a pair of notches disposed in at least one of said guide rails in the vicinity of said caddy input slot on opposite sides of said caddy insertion path for blocking angular entry of said caddy into said player.

2. The player as defined in claim 1 wherein each of said guide rails has a pair of oppositely disposed notches adjacent to said caddy input slot for blocking angular entry of said caddy into said player; wherein each of said guide rails has an upper guiding surface and a lower guiding surface; said upper guiding surfaces and said lower guiding surfaces of said guide rails serving to guide said caddy substantially along said caddy insertion path; wherein said notches are oppositely disposed in said upper guiding surface and said lower guiding surface of each of said guide rails near said caddy input slot.

3. In a record player for recovering prerecorded information from a disc record; said record being enclosed in a planar protective caddy consisting of a sleeve having a record enclosing cavity in communication with an edge opening and a record retaining spine slidably disposed in said cavity; said record retaining spine having an opening for receiving an enclosed record to form a record/spine assembly; an occupied caddy being inserted into an input slot provided in said player substantially along a path defined by a pair of guide rails to load an enclosed record/spine assembly into said player; said player having a mechanism for extracting said enclosed record/spine assembly from said sleeve for retention in said player when said sleeve is withdrawn from said player after a full insertion of said caddy into said player; said sleeve being reinserted into said player along said path for retrieving said record/spine assembly; an improvement comprising a pair of notches provided in at least one of said guide rails in the vicinity of said caddy input slot on opposite sides of said caddy insertion path for reducing the possibility of an angular entry of said sleeve into said player to ensure proper retrieval of said record/spine assembly from said player.

4. The player as defined in claim 3 wherein each of said guide rails has a pair of oppositely disposed notches adjacent to said caddy input slot for blocking angular entry of said caddy into said player; wherein each of said guide rails has an upper guiding surface and a lower guiding surface; said upper guiding surfaces and said lower guiding surfaces of said guide rails serving to guide said caddy substantially along said caddy insertion path; wherein said notches are oppositely disposed in said upper guiding surface and said lower guiding surface of each of said guide rails near said caddy input slot.

5. The record player as defined in claim 3 for use with a planar protective caddy wherein the interior surfaces of said sleeve are fitted with a pair of elongated pads disposed along said edge opening for preventing foreign matter from getting into said record enclosing cavity of said sleeve.

* * * * *